(12) United States Patent  
Ogawa et al.

(10) Patent No.: US 8,785,047 B2  
(45) Date of Patent: Jul. 22, 2014

(54) LITHIUM-ION SECONDARY BATTERY AND METHOD OF CHARGING LITHIUM-ION SECONDARY BATTERY

(75) Inventors: Kazuya Ogawa, Tokyo (JP); Tsuyoshi Iijima, Tokyo (JP); Satoshi Maruyama, Tokyo (JP)

(73) Assignee: TDK Corporation, Tokyo (JP)

( * ) Notice: Subject to any disclaimer, the term of this patent is extended or adjusted under 35 U.S.C. 154(b) by 2104 days.

(21) Appl. No.: 11/066,247

(22) Filed: Feb. 25, 2005

(65) Prior Publication Data

US 2005/0233218 A1     Oct. 20, 2005

(30) Foreign Application Priority Data

Feb. 25, 2004    (JP) ................ P2004-050356

(51) Int. Cl.
*H01M 4/133* (2010.01)
*H01M 4/587* (2010.01)

(52) U.S. Cl.
USPC ...................................... 429/231.8

(58) Field of Classification Search
USPC ...................................... 429/231.8
See application file for complete search history.

(56) References Cited

U.S. PATENT DOCUMENTS

| | | | | |
|---|---|---|---|---|
| 5,340,670 A * | 8/1994 | Takami et al. | ................ | 429/331 |
| 5,573,868 A | 11/1996 | Umemoto et al. | | |
| 5,612,155 A * | 3/1997 | Takami et al. | ................ | 429/331 |
| 5,698,341 A * | 12/1997 | Tamaki et al. | ............ | 429/231.8 |
| 6,156,457 A * | 12/2000 | Takami et al. | ............ | 429/231.4 |
| 6,287,729 B1 * | 9/2001 | Tamaki et al. | ............ | 429/231.8 |
| 2003/0118904 A1 | 6/2003 | Hosokawa et al. | | |

FOREIGN PATENT DOCUMENTS

| | | |
|---|---|---|
| CN | 1151617 A | 6/1997 |
| CN | 1245592 A | 2/2000 |
| JP | A 05-21093 | 1/1993 |
| JP | A 05-021093 | 1/1993 |
| JP | A 05-111184 | 4/1993 |
| JP | A-06-275321 | 9/1994 |
| JP | A 06-318459 | 11/1994 |
| JP | A-07-006756 | 1/1995 |
| JP | A 07-296853 | 11/1995 |
| JP | A-08-007885 | 1/1996 |

(Continued)

OTHER PUBLICATIONS

English Machine Translation of Yoshida JP 2000-173666 (pp. 1-11). Jun. 2000.*

(Continued)

*Primary Examiner* — Tracy Dove  
(74) *Attorney, Agent, or Firm* — Oliff PLC

(57) ABSTRACT

A lithium-ion secondary battery device comprises a positive electrode collector having a surface formed with a positive electrode active material layer containing a positive electrode active material; a negative electrode collector having a surface formed with a negative electrode active material layer containing a negative electrode active material; an electrically insulating porous separator; and an electrolyte containing a lithium salt and being in contact with the positive electrode active material layer, negative electrode active material layer, and separator. The negative electrode active material is a carbon material having a graphite structure. The amount of the carbon material supported by the negative electrode active material layer is 2.0 to 4.0 mg/cm$^2$. The graphite structure in an X-ray diffraction pattern of the carbon material exhibits a peak intensity P101 of (101) plane and a peak intensity P100 of (100) plane having a ratio (P101/P100) of 2.0 to 2.8 therebetween.

7 Claims, 7 Drawing Sheets

| | NEGATIVE ELECTRODE ACTIVE MATERIAL | PEAK INTENSITY RATIO P101/P100 OF NEGATIVE ELECTRODE ACTIVE MATERIAL [-] | SUPPORTED AMOUNT OF NEGATIVE ELECTRODE ACTIVE MATERIAL mg/cm$^2$ | SUPPORTED AMOUNT OF POSITIVE ELECTRODE ACTIVE MATERIAL mg/cm$^2$ | CAPACITY MAINTENANCE RATIO AFTER 100 CYCLES % | CHARGING COMPLETION TIME | ENERGY DENSITY Wh/L |
|---|---|---|---|---|---|---|---|
| EXAMPLE 1 | NATURAL GRAPHITE (MSG MADE BY BTR) | 2.4 | 3.0 | 5.5 | 95.8 | 8m28s | 170 |
| EXAMPLE 2 | NATURAL GRAPHITE (MSG MADE BY BTR) | 2.4 | 3.3 | 6.0 | 96.4 | 8m51s | 172 |
| EXAMPLE 3 | NATURAL GRAPHITE (MSG MADE BY BTR) | 2.4 | 3.8 | 7.0 | 93.7 | 9m48s | 176 |
| EXAMPLE 4 | NATURAL GRAPHITE (MSG MADE BY BTR) | 2.4 | 2.2 | 4.0 | 96.2 | 8m16s | 160 |
| COMPARATIVE EXAMPLE 1 | NATURAL GRAPHITE (MSG MADE BY BTR) | 2.4 | 4.1 | 7.5 | 84.3 | 10m58s | 177 |
| COMPARATIVE EXAMPLE 2 | NATURAL GRAPHITE (MSG MADE BY BTR) | 2.4 | 1.9 | 3.5 | 96.6 | 8m18s | 154 |

(56) References Cited

FOREIGN PATENT DOCUMENTS

| | | |
|---|---|---|
| JP | A 08-045550 | 2/1996 |
| JP | A 09-283117 | 10/1997 |
| JP | A 2000-173666 | 6/2000 |
| JP | A 2002-208401 | 7/2002 |
| JP | A 2002-270182 | 9/2002 |
| JP | A-2003-077476 | 3/2003 |
| JP | A 2003-123753 | 4/2003 |
| JP | A 2003-217582 | 7/2003 |
| JP | A-2003-217585 | 7/2003 |
| JP | A-2003-249225 | 9/2003 |

OTHER PUBLICATIONS

English-language translation of Notice of Office Action of JP 2004-050356 issued on Jul. 10, 2007.

* cited by examiner

Fig. 6

| | NEGATIVE ELECTRODE ACTIVE MATERIAL | PEAK INTENSITY RATIO P101/P100 OF NEGATIVE ELECTRODE ACTIVE MATERIAL [-] | SUPPORTED AMOUNT OF NEGATIVE ELECTRODE ACTIVE MATERIAL mg/cm² | SUPPORTED AMOUNT OF POSITIVE ELECTRODE ACTIVE MATERIAL mg/cm² | CAPACITY MAINTENANCE RATIO AFTER 100 CYCLES % | CHARGING COMPLETION TIME | ENERGY DENSITY Wh/L |
|---|---|---|---|---|---|---|---|
| EXAMPLE 1 | NATURAL GRAPHITE (MSG MADE BY BTR) | 2.4 | 3.0 | 5.5 | 95.8 | 8m28s | 170 |
| EXAMPLE 2 | NATURAL GRAPHITE (MSG MADE BY BTR) | 2.4 | 3.3 | 6.0 | 96.4 | 8m51s | 172 |
| EXAMPLE 3 | NATURAL GRAPHITE (MSG MADE BY BTR) | 2.4 | 3.8 | 7.0 | 93.7 | 9m48s | 176 |
| EXAMPLE 4 | NATURAL GRAPHITE (MSG MADE BY BTR) | 2.4 | 2.2 | 4.0 | 96.2 | 8m16s | 160 |
| COMPARATIVE EXAMPLE 1 | NATURAL GRAPHITE (MSG MADE BY BTR) | 2.4 | 4.1 | 7.5 | 84.3 | 10m58s | 177 |
| COMPARATIVE EXAMPLE 2 | NATURAL GRAPHITE (MSG MADE BY BTR) | 2.4 | 1.9 | 3.5 | 96.6 | 8m18s | 154 |

Fig.7

| | NEGATIVE ELECTRODE ACTIVE MATERIAL | PEAK INTENSITY RATIO P101/P100 [-] | SUPPORTED AMOUNT OF NEGATIVE ELECTRODE ACTIVE MATERIAL mg/cm² | SUPPORTED AMOUNT OF POSITIVE ELECTRODE ACTIVE MATERIAL mg/cm² | CAPACITY MAINTENANCE RATIO AFTER 100 CYCLES % | CHARGING COMPLETION TIME | ENERGY DENSITY Wh/L |
|---|---|---|---|---|---|---|---|
| EXAMPLE 1 | NATURAL GRAPHITE (MSG MADE BY BTR) | 2.4 | 3.0 | 5.5 | 95.8 | 8m28s | 170 |
| EXAMPLE 5 | NATURAL GRAPHITE (GP870 MADE BY HITACHI POWDERED METALS) | 2.6 | 3.0 | 5.5 | 96.2 | 8m20s | 171 |
| EXAMPLE 6 | SYNTHETIC GRAPHITE GRAPHITE (SGB-R SGB-R MADE BY SEC) | 2.7 | 3.0 | 5.5 | 95.1 | 8m16s | 170 |
| COMPARATIVE EXAMPLE 3 | SYNTHETIC GRAPHITE (MCMB MADE BY OSAKA GAS) | 1.2 | 3.0 | 5.5 | 52.1 | 10m08s | 165 |
| COMPARATIVE EXAMPLE 4 | SYNTHETIC GRAPHITE (MCF MADE BY PETOCA) | 1.5 | 3.0 | 5.5 | 72.2 | 9m34s | 168 |

LITHIUM-ION SECONDARY BATTERY AND METHOD OF CHARGING LITHIUM-ION SECONDARY BATTERY

BACKGROUND OF THE INVENTION

1. Field of the Invention

The present invention relates to a lithium-ion secondary battery and a method of charging a lithium-ion secondary battery.

2. Related Background Art

Along with recent dissemination and development of various portable devices, lithium-ion secondary batteries have further been desired to reduce their cost and improve their characteristics. One of characteristics expected to improve is a rapid charging characteristic. Mainly known as conventional methods of charging lithium-ion secondary batteries are constant-current charging, constant-current/constant-voltage charging, and constant-voltage charging (see, for example, Japanese Patent Application Laid-Open Nos. 5-111184, 7-296853, 8-45550, and 5-21093).

The constant-current charging is a method in which the charging voltage is regulated so as to attain a fixed charging current, and the charging of the secondary battery is stopped when the charging voltage reaches a predetermined full-charge voltage (e.g., 4.2 V). In the constant-current charging, the charging efficiency deteriorates under the influence of IR drop and polarization when the charging voltage approaches the full-charge voltage, whereby the charging amount tends to be in short. This tendency becomes remarkable in particular when rapid charging is performed. In the case where such a constant current charging method is used, if the constant-current charging is further carried out to a voltage higher than the full-charge voltage in order to increase the charging amount after the full-charge voltage is attained, an overcharged state may partly occur in the positive electrode or negative electrode in the secondary battery, thereby decomposing electrolytes and generating gases.

In the constant-current/constant-voltage charging, which is normally used for charging lithium-ion secondary batteries, constant-current charging is performed until the charging voltage becomes the full-charge voltage, then the charging is switched to constant-voltage charging, and the charging is terminated when the charging current becomes a predetermined value or lower. This method is more likely to eliminate the shortage in charging amount than is the constant-current charging, but complicates charger circuits, thereby causing the cost to rise.

On the other hand, the constant-voltage charging is a method in which a constant charging voltage is supplied to the secondary battery. When the charging voltage is set appropriately, there is no fear of overcharging the secondary battery. When appropriate charging time and charging stop current value are set, a sufficient charging amount can be obtained, while rapid charging is possible. Also, charger circuits become simpler than those in the constant-current/constant-voltage charging, whereby the cost is expected to decrease.

SUMMARY OF THE INVENTION

In the constant-voltage charging, however, a very large charging current flows through the lithium-ion secondary battery at the initial stage of charging. When such a charging current flows through the lithium-ion secondary battery, there may occur a problem of a negative electrode active material failing to completely intercalate with lithium ions. When the negative electrode active material does not completely intercalate with lithium ions, dendrite deposition of lithium may occur, thereby causing a severe capacitance deterioration as charging/discharging cycles progress.

From the viewpoint of reducing the size of devices, on the other hand, lithium-ion secondary batteries are desired to achieve a sufficiently high volume energy density.

In view of the problems mentioned above, it is an object of the present invention to provide a lithium-ion secondary battery which is less likely to cause a severe capacity deterioration as charging/discharging cycles progress even when the constant-voltage charging is performed, while having a sufficient volume energy density.

Means for Solving Problem

As a result of diligent studies, the inventors have found that the object of the present invention is achievable when the amount of negative electrode active material supported on a collector is made remarkably smaller than that conventionally employed while a carbon material having a predetermined graphite structure is used as the negative electrode active material.

The present invention provides a lithium-ion secondary battery comprising a positive electrode collector having a surface formed with a positive electrode active material layer containing a positive electrode active material; a negative electrode collector having a surface formed with a negative electrode active material layer containing a negative electrode active material; an electrically insulating porous separator; and an electrolyte containing a lithium salt and being in contact with the positive electrode active material layer, negative electrode active material layer, and separator; wherein the positive and negative electrode collectors are disposed such that the positive and negative electrode active material layers hold the separator therebetween. The negative electrode active material is a carbon material having a graphite structure. The amount of the carbon material supported by the negative electrode active material layer is 2.0 to 4.0 mg/cm$^2$. The graphite structure in an X-ray diffraction pattern of the carbon material exhibits a peak intensity P101 of (101) plane and a peak intensity P100 of (100) plane having a ratio (P101/P100) of 2.0 to 2.8 therebetween.

Such a lithium-ion secondary battery is less likely to cause a severe capacity deterioration as charging/discharging cycles progress even when constant-voltage charging is carried out, and yields a sufficient value of volume energy density.

The reason why such a characteristic is obtained is not completely clear, but may be inferred as follows.

When the supported amount of the carbon material as a negative electrode active material is 4.0 mg/cm$^2$ or less, which is much smaller than that conventionally employed, the thickness of the negative electrode active material layer becomes much thinner than that conventionally available. Therefore, the Li concentration polarization is harder to occur in the negative electrode active material layer than before. As a consequence, even when a large current is supplied to the lithium-ion secondary battery by constant-voltage charging, the negative electrode active material is not inhibited from being intercalated with lithium ions, whereby the capacity seems to become harder to deteriorate.

When the supported amount of the carbon material is 2.0 mg/cm$^2$ or less, on the other hand, the lithium ion intercalating process at the interface between the negative electrode active material and electrolyte becomes a rate-determining factor, so that faster charging cannot be achieved by further reducing the supported amount, and the negative electrode active material layer becomes too thin, so that the volume occupied by the collector in the lithium-ion secondary battery becomes much larger than that of the negative electrode active material, whereby the volume energy density seems to become insufficient.

Carbon materials having an X-ray diffraction peak ratio (P101/P100) of 2.0 or greater yields a higher degree of graphitization. Using such a carbon material as a negative electrode active material seems to enable intercalation at a sufficient rate even when a large current is supplied at the time of charging.

On the other hand, it is hard to attain a carbon material with a peak ratio (P101/P100) exceeding 2.8.

In such a lithium-ion secondary battery, it will be preferred if the amount of the positive electrode active material supported by the positive electrode active material layer is 4.0 to 7.0 mg/cm$^2$.

When a plurality of secondary battery elements each comprising a positive electrode collector, a negative electrode collector, and a separator are laminated, the capacity can favorably be made greater.

Constant-voltage charging at 4.2 V enables rapid charging of such a lithium-ion secondary battery.

The present invention can realize a lithium-ion secondary battery which is less likely to cause a severe capacity deterioration as charging/discharging cycles progress even when the constant-voltage charging is performed, while having a sufficient volume energy density.

BRIEF DESCRIPTION OF THE DRAWINGS

FIG. 6 is a table showing conditions and results of Examples 1 to 4 and Comparative Examples 1 and 2; and FIG. 7 is a table showing conditions and results of Examples 1, 5, and 6 and Comparative Examples 3 and 4.

DESCRIPTION OF THE PREFERRED EMBODIMENTS

First Embodiment

First, an embodiment of the lithium-ion secondary battery in accordance with the present invention will be explained in detail.

Figure 1:
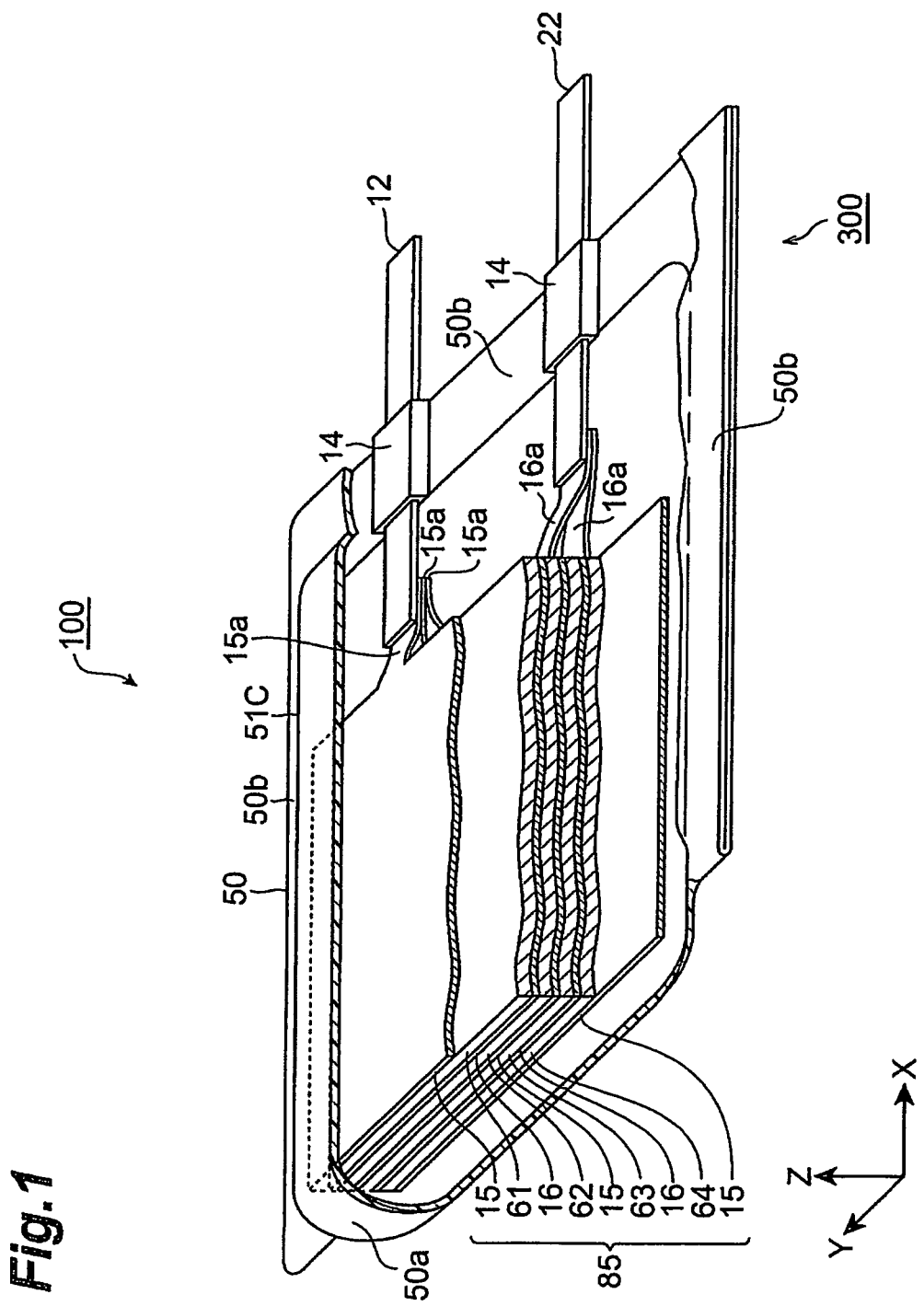
FIG. 1 is a partly broken perspective view showing the lithium-ion secondary battery in accordance with an embodiment of the present invention.
Figure 2:
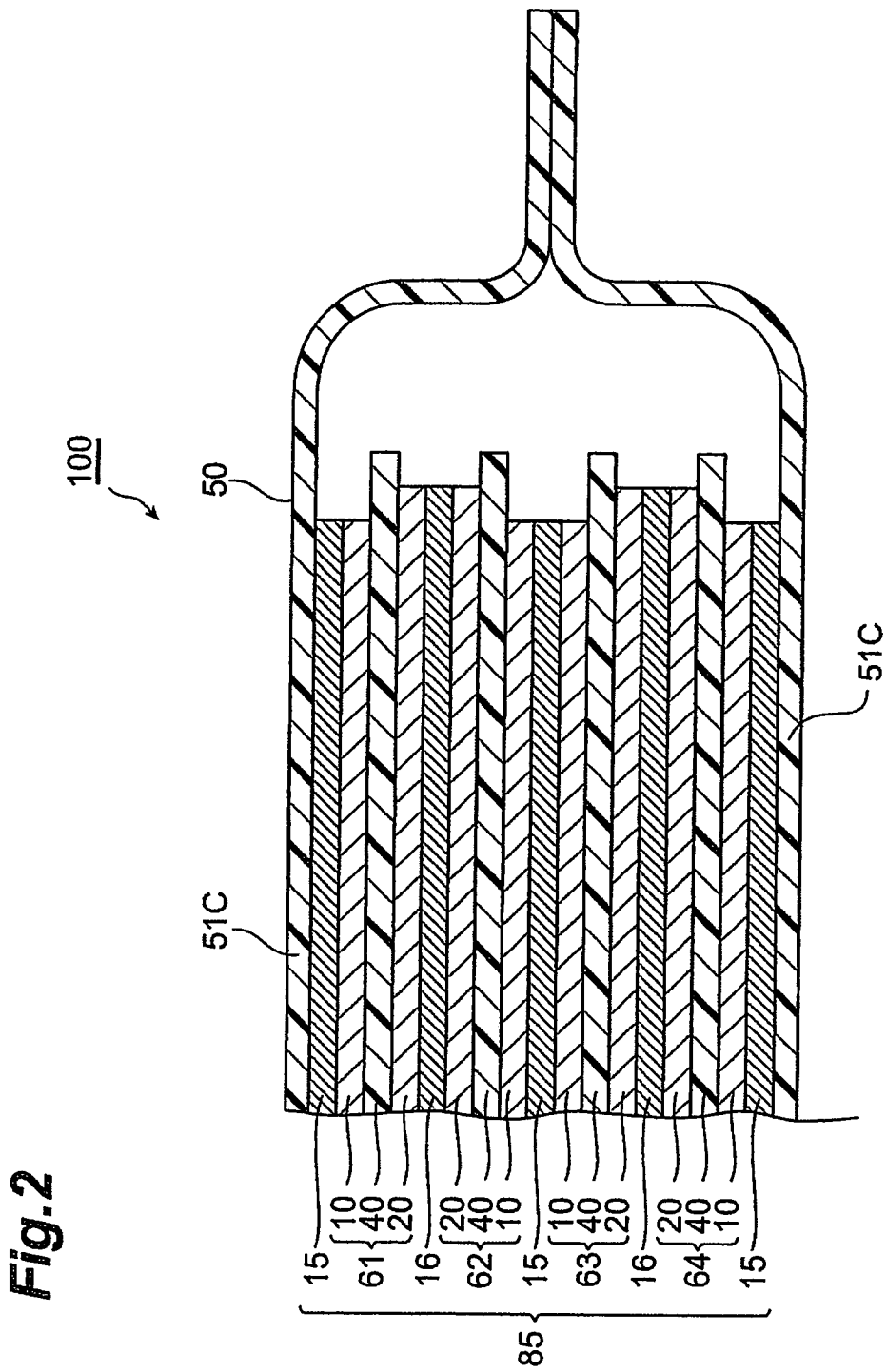
FIG. 2 is a sectional view showing the lithium-ion secondary battery of FIG. 1 taken along the YZ plane.
Figure 3:
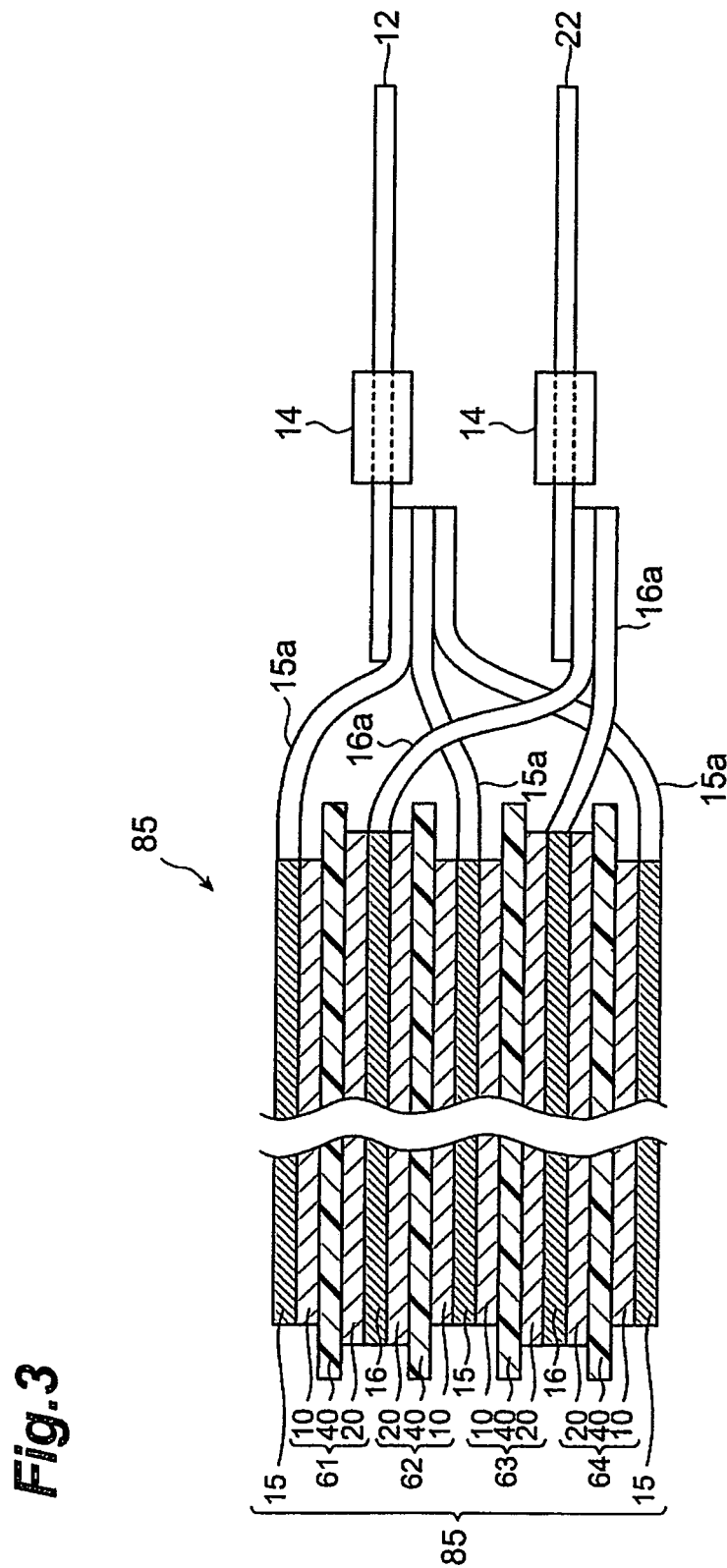
FIG. 3 is a view showing the lithium-ion secondary battery of FIG. 1 as seen along the XZ plane.

FIG. 1 is a partly broken perspective view showing the lithium-ion secondary battery 100 in accordance with the first embodiment of the present invention. FIG. 2 is a sectional view taken along the YZ plane of FIG. 1. FIG. 3 is a view showing a laminate structure 85 and leads 12 and 22 of FIG. 1 as seen along a ZX cross section.

As shown in FIGS. 1 to 3, the lithium-ion secondary battery 100 in accordance with this embodiment is mainly constituted by the laminate structure 85, a case (package) 50 accommodating the laminate structure 85 in a closed state, and the leads 12 and 22 for connecting the laminate structure 85 to the outside of the case 50. The laminate structure 85 comprises, successively from the upper side, a positive electrode collector 15, a secondary battery element 61, a negative electrode collector 16, a secondary battery element 62, a positive electrode collector 15, a secondary battery element 63, a negative electrode collector 16, a secondary battery element 64, and a positive collector 15, each having a planar form.

Secondary Battery Element

As shown in FIG. 2, each of the secondary battery elements 61, 62, 63, 64 is constituted by a planar cathode (positive electrode active material layer) 10 and a planar anode (negative electrode active material layer) 20 which oppose each other; a planar electrically insulating separator 40 disposed between the cathode 10 and anode 20 adjacent thereto; and an electrolytic solution (not depicted) which includes an electrolyte and is contained in the cathode 10, anode 20, and separator 40.

Here, the anodes 20 of the secondary battery elements 61 to 64 are formed on their corresponding surfaces of the anode collectors 16, whereas the cathodes 10 of the secondary battery elements 61 to 64 are formed on their corresponding surfaces of the cathode collectors 15. Here, for convenience of explanation, the anode and cathode are defined according to polarities of the lithium-ion secondary battery 100 at the time of discharging. At the time of charging the lithium-ion secondary battery 100, electric charges flow in a direction opposite from that at the time of discharging, whereby the anode and cathode replace each other.

Anode

The anode 20 is a layer containing a negative electrode active material, a conductive auxiliary agent, a binder, and the like. In the following, the anode 20 will be explained.

The negative electrode active material is a carbon material having a graphite structure, and can reversibly proceed with occlusion and release of lithium ions, desorption and insertion of lithium ions, or doping and undoping of lithium ions with their counter anions (e.g., $ClO_4^-$).

In this carbon material, the ratio (P101/P100) between the diffraction peak intensity P101 of (101) plane and the diffraction peak intensity P100 of (100) plane in the graphite structure falls within the range of 2.0 to 2.8. This ratio will hereinafter be referred to as peak intensity ratio P101/P100. In the X-ray diffraction, CuKα can be employed as an X-ray source. The peak intensity is the peak height.

Examples of such a carbon material include natural graphite and synthetic graphite.

The amount of the carbon material supported by the anode 20 is 2.0 to 4.0 mg/cm$^2$. Here, the supported amount refers to the weight of the carbon material having the graphite structure per unit surface area of the negative electrode collector 16.

The conductive auxiliary agent is not restricted in particular as long as it allows the anode 20 to attain a favorable conductivity, whereby known conductive auxiliary agents can be used. Examples of the conductive auxiliary agent include carbon blacks; carbon materials; fine powders of metals such as copper, nickel, stainless, and iron; mixtures of carbon materials and fine metal powders; and conductive oxides such as ITO.

The binder is not restricted in particular as long as it can bind particles of the negative electrode active material and conductive auxiliary agent to the negative electrode collector 16, whereby known binders can be used. Examples of the binder include fluorine resins such as polyvinylidene fluoride (PVDF), polytetrafluoroethylene (PTFE), tetrafluoroethylene/hexafluoropropylene copolymer (FEP), tetrafluoroethylene/perfluoroalkylvinylether copolymer (PEA), ethylene/tetrafluoroethylene copolymer (ETFE), polychlorotrifluoroethylene (PCTFE), ethylene/chlorotrifluoroethylene copolymer (ECTFE), and polyvinyl fluoride (PVF); and styrene/butadiene rubber (SBR).

The material of the negative electrode collector 16 binding with the anode 20 is not limited in particular as long as it is a material normally employed as an anode collector of a lithium-ion secondary battery. Its examples include copper and nickel. As shown in FIGS. 1 and 3, at an end, each negative electrode collector 16 extends outward so as to form a tongue 16a.

Cathode

The cathode 10 is a layer containing a positive electrode active material, a conductive auxiliary agent, a binder, and the like. In the following, the cathode 10 will be explained.

The positive electrode active material is not restricted in particular as long as it can reversibly proceed with occlusion and release of lithium ions, desorption and insertion of lithium ions, or doping and undoping of lithium ions with their counter anions (e.g., $ClO_4^-$), whereby known electrode active materials can be used. Its examples include lithium cobaltate ($LiCoO_2$); lithium nickelate ($LiNiO_2$); lithium manganese spinel ($LiMn_2O_4$); mixed metal oxides represented by the general formula of $LiNi_xCo_yMn_zO_2$ (x+y+z=1); and mixed metal oxides such as lithium vanadium compound ($LiV_2O_5$), olivine-type $LiMPO_4$ (where M is Co, Ni, Mn, or Fe), and lithium titanate ($Li_4Ti_5O_{12}$).

The supported amount of the positive electrode active material per unit surface area of the positive electrode collector 15 is preferably 4.0 to 7.0 mg/cm$^2$, though it can suitably be set as appropriate in conformity to the supported amount of the negative electrode active material in the anode 20.

As individual constituents other than the positive electrode active material contained in the cathode 10, the same materials as those constituting the anode 20 can be used. Preferably, the cathode 10 also contains electronically conductive particles as in the anode 20.

The positive electrode collector 15 binding with the cathode 10 is not restricted in particular as long as it is a metal material normally used as a cathode collector of a lithium-ion secondary battery. An example of the material is aluminum. As shown in FIGS. 1 and 3, at an end, each positive electrode collector 15 extends outward so as to form a tongue 15a.

Separator

The separator 40 disposed between the anode 20 and cathode 10 is not restricted in particular as long as it is formed from an electrically insulating porous body, whereby separators used in known secondary battery elements can be employed. Examples of the electrically insulating porous body include laminates of films made of polyethylene, polypropylene, and polyolefin, extended films of mixtures of the resins mentioned above, and fibrous nonwoven fabrics made of at least one species of constituent material selected from the group consisting of cellulose, polyester, and polypropylene.

Here, as shown in FIG. 3, the separator 40, anode 20, and cathode 10 successively reduce their areas in this order in each of the secondary battery elements 61 to 64, so that end faces of the anode 20 project out of end faces of the cathode 10, whereas end faces of the separator 40 project out of the end faces of the anode 20 and cathode 10.

As a consequence, even when the layers slightly shift their positions in a direction intersecting the laminating direction because of errors at the time of manufacture and the like, it becomes easier for the whole surface of the cathode 10 to oppose the anode 20 in each of the secondary battery elements 61 to 64. Therefore, lithium ions released from the cathode 10 are sufficiently taken into the anode 20 by way of the separator 40. If lithium ions are not sufficiently taken into the anode 20, those not taken into the anode 20 may be deposited, so as to reduce carriers of electric energy, thereby deteriorating the energy capacity of the battery. Since the separator 40 is larger than each of the cathode 10 and anode 20 and projects out of the end faces of the cathode 10 and anode 20, short circuits occurring when the cathode 10 and anode 20 come into contact with each other are also reduced.

Electrolytic Solution

The electrolytic solution is contained within the anode 20, the cathode 10, and pores of the separator 40. The electrolytic solution is not restricted in particular, whereby electrolytic solutions (aqueous electrolytic solutions and electrolytic solutions with organic solvents) containing lithium salts used in known lithium-ion secondary battery elements can be employed. Since the durable voltage of aqueous electrolytic solutions at the time of charging is limited to a low level because of their electrochemically low decomposition voltage, it will be preferred if the electrolytic solution is an electrolytic solution using an organic solvent (a nonaqueous electrolytic solution). Favorably employable as the electrolytic solution of the secondary battery element is one in which a lithium salt is dissolved in a nonaqueous solvent (organic solvent). As the lithium salt, salts such as $LiPF_6$, $LiClO_4$, $LiBF_4$, $LiAsF_6$, $LiCF_3SO_3$, $LiCF_3$, $CF_2SO_3$, $LiC(CF_3SO_2)_3$, $LiN(CF_3SO_2)_2$, $LiN(CF_3CF_2SO_2)_2$, $LiN(CF_3SO_2)(C_4F_9SO_2)$, and $LiN(CF_3CF_2CO)_2$ are used. These salts may be used singly or in combination of two or more species.

As the organic solvent, solvents used in known secondary battery elements can be employed. Preferred examples of the solvent include propylene carbonate, ethylene carbonate, and diethyl carbonate. They may be used singly or in mixtures in which at least two species are mixed at an appropriate ratio.

In this embodiment, the electrolytic solution may be not only a liquid, but also a gelled electrolyte obtained when a gelling agent is added to the liquid. Instead of the electrolytic solution, a solid electrolyte (a solid polymer electrolyte or an electrolyte made of an ionically conductive inorganic material) may be contained as well.

Leads

As shown in FIG. 1, the leads 12 and 22, each having a ribbon-like outer form, project from within the case 50 by way of a seal part 50b.

The lead 12 is formed from a conductor material such as a metal. An example of the conductor material is aluminum. As shown in FIG. 3, the end part of the lead 12 within the case 50 is joined to the respective tongues 15a, 15a, 15a of the positive electrode collectors 15, 15, 15 by resistance welding or the like, whereas the lead 12 is electrically connected to the cathodes 10 by way of the respective positive electrode collectors 15.

On the other hand, the lead 22 is formed from a conductor material such as a metal. Examples of the conductor material are copper and nickel. The end part of the lead 22 within the case 50 is joined to the respective tongues 16a, 16a, 16a of the negative electrode collectors 16, 16, 16 by resistance welding or the like, whereas the lead 22 is electrically connected to the anodes 20 by way of the respective negative electrode collectors 16.

The parts of the leads 12, 22 held by the seal part 50b of the case 50 are covered with insulators 14 made of a resin or the like in order to enhance the sealability as shown in FIGS. 1 and 3. Though not restricted in particular, it will be preferred if each of them is formed from a synthetic resin, for example. The leads 12 and 22 are separated from each other in a direction orthogonal to the laminating direction of the laminate structure 85.

Case

The case 50 is not restricted in particular as long as it can seal the laminate structure 85 and prevent air and moisture from entering the inside of the case, whereby cases used in known secondary battery elements can be employed. For example, synthetic resins such as epoxy resins, and resin-laminated metal sheets such as those of aluminum can be used. As shown in FIG. 1, the case 50 is one in which a rectangular flexible sheet 51C is folded into two at a substantially longitudinal center part, and holds the laminate structure 85 from both sides of the laminating direction (vertical direction). Seal parts 50b in three sides excluding the turned-over part 50a in the end parts of the sheet 51C folded into two are sealed with heat or an adhesive, so as to encapsulate the laminate structure 85 therewithin. Also, the case 50 is bonded to the insulator 14 at the seal part 50b, thereby sealing the leads 12, 22.

Manufacturing Method

An example of method of making the above-mentioned lithium-ion secondary battery 100 will now be explained.

First, respective coating liquids (slurries) containing constituting materials for forming electrode layers to become the anode 20 and cathode 10 are prepared. The anode coating liquid is a solvent containing the above-mentioned negative electrode active material, conductive auxiliary agent, binder, and the like; whereas the cathode coating liquid is a solvent containing the above-mentioned positive electrode active material, conductive auxiliary agent, binder, and the like. The solvent used in the coating liquid is not restricted in particular as long as it is adapted to dissolve the binder and disperse the active materials and conductive auxiliary agent. For example, N-methyl-2-pyrrolidone and N,N-dimethylformamide can be used.

Figure 4:
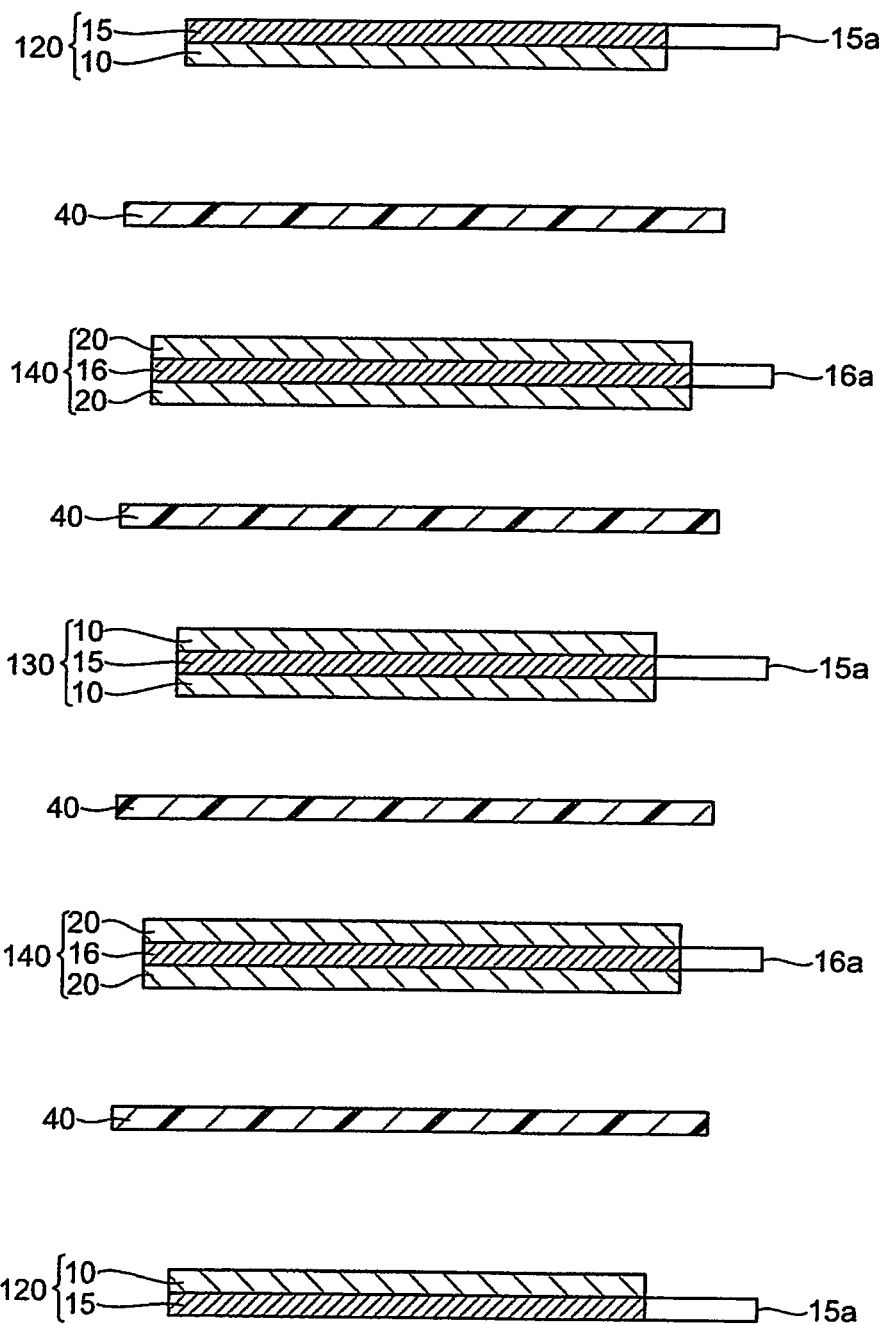
FIG. 4 is a sectional view showing a step of making the lithium-ion secondary battery of FIG. 1.

Next, positive electrode collectors 15 made of aluminum or the like, and negative electrode collectors 16 made of copper, nickel, or the like are prepared. Subsequently, as shown in FIG. 4, the cathode coating liquid is applied to one face of a positive electrode collector 15 and then is dried, so as to form a cathode 10. Thus obtained product is cut out into rectangular forms each having a tongue 15a, so as to yield two 2-layer laminates 120 for both ends as shown in FIG. 4. Similarly, the cathode coating liquid is applied to both faces of a positive electrode collector 15 and then is dried, so as to form cathodes 10 on both sides. Thus formed product is cut out into a rectangular form having a tongue 15a, so as to yield one 3-layer laminate 130 for the cathode. The anode coating liquid is applied to both faces of a negative electrode collector 16 and then is dried, so as to form anodes 20 on both sides. Thus obtained product is cut out into rectangular forms each having a tongue 16a, so as to yield two 3-layer laminates 140 for anodes. Here, techniques for applying the coating liquids to the collectors are not restricted in particular, but may be determined appropriately according to the material, form, and the like of metal sheets for collectors. Examples of the techniques include metal-mask printing, electrostatic coating, dip coating, spray coating, roll coating, doctor blading, gravure coating, and screen printing. After being applied, the coating is extended by planar pressing, calender rolls, etc. as necessary. Here, the anode coating liquid is applied such that the amount of the electrode active material supported by the anode 20 falls within the range of 2.0 to 4.0 mg/cm$^2$. It will also be preferred if the cathode coating liquid is applied such that the amount of the positive electrode active material supported by the cathode 10 falls within the range of 4.0 to 7.0 mg/cm$^2$. Both sides of the tongues 15a, 16a are free of the cathode 10 and anode 20.

Here, as shown in FIGS. 3 and 4, each of the rectangles of cathodes 10 of the 2-layer laminates 120 and 3-layer laminate 130 is made smaller than each of the rectangles of the anodes 20 in the 3-layer laminates 140.

Subsequently, separators 40 are prepared. Each separator 40 is made by cutting out an insulating porous material into a rectangle greater than each of the rectangles of the anodes 20 of the 3-layer laminates 140.

Then, the 2-layer laminates 120, 3-layer laminate 130, and 3-layer laminates 140 are laminated with the separators 40 interposed therebetween in the order shown in FIG. 4, i.e., into the laminate of 2-layer laminate 120/separator 40/3-layer laminate 140/separator 40/3-layer laminate 130/separator 40/3-layer laminate 140/separator 40/2-layer laminate 120, and are heated while center parts in the surfaces on both sides in the laminating direction are held, whereby the laminate structure 85 shown in FIG. 3 is obtained. Here, as shown in FIG. 4, they are arranged such that each separator 40 has one surface in contact with the cathode 10 and the other surface in contact with the anode 20.

Also, the 2-layer laminates 120, 3-layer laminates 140, 3-layer laminate 130, and separators 40 are arranged such that the end faces of the 3-layer laminates 140 for anodes project out of the end faces of the 2-layer laminates 120 and 3-layer laminate 130, whereas the end faces of the separators 40 project out of the end faces of the 3-layer laminates 140.

Then, as shown in FIG. 3, leads 12, 22 shown in FIG. 3 are prepared, and their longitudinal center parts are covered with insulators 14 made of a resin or the like, respectively.

Subsequently, as shown in FIG. 3, the tongues 15a and an end part of the lead 12 are welded together, and the tongues 16a and an end part of the lead 22 are welded together.

This completes a laminate structure having the leads 12 and 22 connected thereto.

An example of method of making the case 50 will now be explained. First, as shown in (a) of FIG. 5, a rectangular sheet 51B in which aluminum is laminated with a thermobonding resin layer is prepared.

Figure 5:
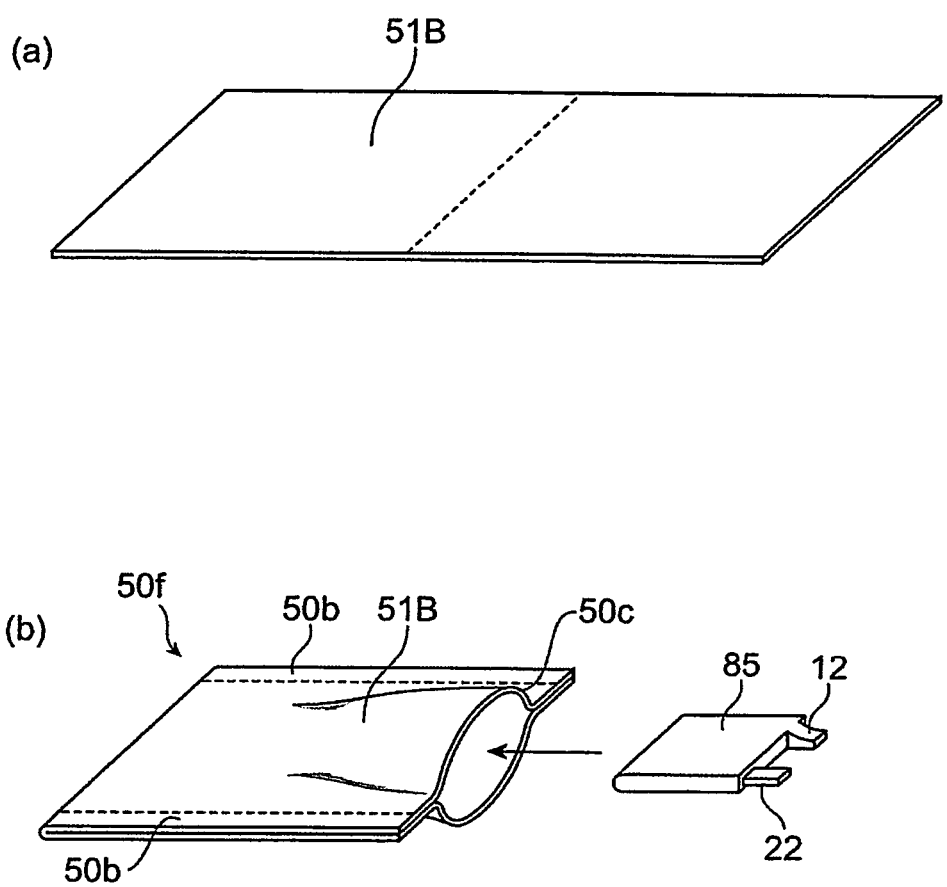
FIG. 5 is a perspective view showing a method of manufacturing a lithium-ion secondary battery.

Next, as shown in (b) of FIG. 5, the sheet 51B is folded at a dotted line in the center thereof, and the resulting halves are overlaid on each other. Subsequently, only seal parts 50b, 50b of two sides are heat-sealed with a sealer, for example, by a desirable seal width under a predetermined heating condition. This yields a bag-like case 50f formed with an opening 50c for introducing the laminate 85.

Then, the laminate structure 85 having the leads 12 and 22 connected thereto is inserted into the case 50f in the state provided with the opening 50c. Subsequently, within a vacuum chamber, an electrolytic solution is injected into the case 50f, so that the laminate structure 85 is dipped in the electrolytic solution. Thereafter, the leads 12 and 22 are partly projected from within the case 50f to the outside, and the opening 50c of the case 50f is sealed with a heat sealer. Here, the parts of the leads 12, 22 covered with the insulators 14 are sealed while being held by the opening 50c. This completes the making of the lithium-ion secondary battery 100.

Such a lithium-ion secondary battery 100 is less likely to cause a severe capacity deterioration as charging/discharging cycles progress even when constant-voltage charging is carried out, and yields a sufficient value of volume energy density.

Without being restricted to the above-mentioned embodiment, the present invention can be modified in various manners.

For example, though the laminate structure 85 comprises four secondary battery elements 61 to 64 each acting as a single cell, it may comprise four or more secondary battery elements, or three or less secondary battery elements, e.g., one element.

EXAMPLES

The present invention will now be explained in further detail with reference to Examples and Comparative Examples, though the present invention is not limited thereto at all.

First, in lithium-ion secondary batteries using the same graphite material as a negative electrode active material, the supported amount of negative electrode active material was changed. Here, lithium-ion secondary batteries each comprising 22 layers of secondary battery elements were made.

Example 1

First, cathode laminates were made by the following procedure. Initially, $LiMn_{0.33}Ni_{0.33}Co_{0.34}O_2$ (where subscripts indicate atomic ratios), acetylene black as a conductive auxiliary agent, and polyvinylidene fluoride (PVdF) as a binder were prepared. They were mixed and dispersed such that the weight ratio of the positive electrode active material/conductive auxiliary agent/binder=90:6:4 in a planetary mixer, and then the viscosity of the resulting mixture was adjusted by an appropriate amount of NMP acting as a solvent mixed therein, whereby a slurry-like cathode coating liquid (slurry) was prepared.

Subsequently, an aluminum foil (having a thickness of 20 μm) was prepared. By doctor blading, the cathode coating liquid was applied to the aluminum foil and dried such that the supported amount of active material became 5.5 mg/cm$^2$. Thus obtained product was pressed with calender rolls such that the applied cathode layer attained a porosity of 28%, and then was punched out into a form having a cathode surface with an area of 17×32 mm and a predetermined tongue-like terminal, whereby a cathode laminate was made. Here, cathode laminates each formed with a cathode on one side alone, and cathode laminates each formed with cathodes on both sides were prepared.

Then, anode laminates were made by the following procedure. First, natural graphite (MSG manufactured by BTR) as a negative electrode active material and PVdF as a binder were prepared. They were compounded such that the weight ratio of the negative electrode active material/binder=95:5, and were mixed and dispersed with a planetary mixer. Then, the viscosity of the resulting mixture was adjusted by an appropriate amount of NMP acting as a solvent mixed therein, whereby a slurry-like anode coating liquid was prepared. The peak intensity ratio P101/P100 of MSG manufactured by BTR was 2.4.

Next, a copper foil (having a thickness of 15 μm) as a collector was prepared. By doctor blading, the anode coating liquid was applied to both sides of the copper foil such that the amount of active material supported by the anode became 3.0 mg/cm$^2$, and then was dried, whereby an anode laminate was obtained. Thereafter, thus obtained product was pressed with calender rolls such that the applied anode layer attained a porosity of 30%. The pressed product was punched out into a form having a cathode surface with an area of 17×32 mm and a predetermined tongue-like terminal, whereby an anode laminate was made. Here, anode laminates each formed with cathodes on both sides were prepared.

Next, a porous film made of polyolefin (with a thickness of 25 μm yielding a Gurley aeration time of 100 s) was punched out into sizes of 18 mm×33 mm, so as to form separators.

Subsequently, the anode laminates and cathode laminates were laminated with separators interposed therebetween, so as to yield a laminate structure having 22 layers of secondary battery elements. The laminate structure was pressed under heat from both end faces, so as to be secured together. Here, they were laminated such that the cathode laminates each having one side carrying a cathode were arranged as the outermost layers of the laminate structure.

Next, a nonaqueous electrolytic solution was prepared as follows. Propylene carbonate (PC), ethylene carbonate (EC), and diethyl carbonate (DEC) were mixed so as to yield a volume ratio of 2:1:7 in this order, thereby yielding a solvent. Subsequently, $LiPF_6$ was dissolved in the solvent so as to attain a concentration of 1.5 mol/dm$^3$. Further, 3 parts by weight of 1,3-propane sultone were added to 100 parts by weight of thus obtained solution, whereby the nonaqueous electrolytic solution was made.

Next, a case in which an aluminum laminate film was formed like a bag was prepared, the laminate structure was inserted therein, and the nonaqueous electrolytic solution was injected therein in a vacuum chamber, so that the laminate structure was dipped in the nonaqueous electrolytic solution. Thereafter, while still under reduced pressure, the entrance part of the package was sealed such that the tongue-like terminals partly project out of the package, and initial charging and discharging was effected, whereby a laminated lithium-ion secondary battery was obtained.

Thus obtained lithium-ion secondary battery was charged at a constant voltage of 4.2 V at room temperature, so as to perform a cycle test. The charging was terminated when the current value was lowered to 0.05 C. The discharging was effected at 10 C, and was terminated when the terminal voltage became 2.5 V.

Example 2

The same procedure was taken as with Example 1 except that the supported amount of negative electrode active material was 3.3 mg/cm$^2$, and that the supported amount of positive electrode active material was 6.0 mg/cm$^2$.

Example 3

The same procedure was taken as with Example 1 except that the supported amount of negative electrode active material was 3.8 mg/cm$^2$, and that the supported amount of positive electrode active material was 7.0 mg/cm$^2$.

Example 4

The same procedure was taken as with Example 1 except that the supported amount of negative electrode active material was 2.2 mg/cm$^2$, and that the supported amount of positive electrode active material was 4.0 mg/cm$^2$.

Comparative Example 1

The same procedure was taken as with Example 1 except that the supported amount of negative electrode active material was 4.1 mg/cm$^2$, and that the supported amount of positive electrode active material was 7.5 mg/cm$^2$.

Comparative Example 2

The same procedure was taken as with Example 1 except that the supported amount of negative electrode active material was 1.9 mg/cm², and that the supported amount of positive electrode active material was 3.5 mg/cm².

FIG. 6 shows the capacity maintenance ratio after 100 cycles, charging completion time, and energy density in each of these cases. Within the range where the supported amount of negative electrode active material was 2.2 to 3.8 mg/cm², the capacity maintenance ratio after 100 cycles was 90% or higher while the energy density was 160 Wh/L or higher as can be seen in Examples 1 to 4. When the supported amount of negative electrode active material was 4.1 mg/cm² as in Comparative Example 1, by contrast, the capacity maintenance ratio after 100 cycles deteriorated to 84.3%. When the supported amount of negative electrode active material was 1.9 mg/cm² as in Comparative Example 2, on the other hand, the supported amount of negative electrode active material became 154 Wh/L, which was not sufficient, and the charging completion time did not appear to be shorter than that of Example 4 in which the supported amount of negative electrode active material was 2.2 mg/cm².

Next, while the supported amount of negative electrode active material was kept at the same level as with Example 1, carbon materials having different peak intensity ratios P101/P100 were used as negative electrode active materials.

Example 5

The same procedure was taken as with Example 1 except that the negative electrode active material was replaced with natural graphite (GP870 manufactured by Hitachi Powdered Metals) having an X-ray diffraction peak intensity ratio P101/P100 of 2.6.

Example 6

The same procedure was taken as with Example 1 except that the negative electrode active material was replaced with synthetic graphite (SGB-R manufactured by SEC) having an X-ray diffraction peak intensity ratio P101/P100 of 2.7.

Comparative Example 3

The same procedure was taken as with Example 1 except that the negative electrode active material was replaced with synthetic graphite (MCMB manufactured by Osaka Gas) having an X-ray diffraction peak intensity ratio P101/P100 of 1.2.

Comparative Example 4

The same procedure was taken as with Example 1 except that the negative electrode active material was replaced with synthetic graphite (MCF manufactured by Petoca) having an X-ray diffraction peak intensity ratio P101/P100 of 1.5.

When the peak intensity ratio P101/P100 was 2.4 to 2.7 as in Examples 1, 5, and 6, the capacity maintenance ratio after 100 cycles exceeded 95%. Also, the energy density was sufficient.

When the peak intensity ratio P101/P100 was 1.5 or less as in Comparative Examples 3 and 4, by contrast, the capacity maintenance ratio after 100 cycles was 72.2% or less.

What is claimed is:

1. A lithium-ion secondary battery comprising:
   a positive electrode collector having a surface formed with a positive electrode active material layer containing a positive electrode active material;
   a negative electrode collector having a surface formed with a negative electrode active material layer containing a negative electrode active material;
   an electrically insulating porous separator; and
   an electrolyte containing a lithium salt and being in contact with the positive electrode active material layer, the negative electrode active material layer, and the separator;
   wherein the positive and negative electrode collectors are disposed such that the positive and negative electrode active material layers hold the separator therebetween;
   wherein the negative electrode active material is a carbon material having a graphite structure;
   wherein the amount of the carbon material supported by the negative electrode active material layer is 2.2 to 4.0 mg/cm²; and
   wherein the graphite structure in an X-ray diffraction pattern of the carbon material exhibits a peak intensity P101 of (101) plane and a peak intensity P100 of (100) plane having a ratio (P101/P100) of 2.4 to 2.8 therebetween.

2. A lithium-ion secondary battery according to claim 1, wherein the amount of the positive electrode active material supported by the positive electrode active material layer is 4.0 to 7.0 mg/cm².

3. A lithium-ion secondary battery according to claim 1, wherein a plurality of secondary battery elements each including the positive electrode collector, the negative electrode collector, and the separator are laminated.

4. A method of rapidly charging a lithium-ion secondary battery, the method comprising the step of subjecting the lithium-ion secondary battery according to claim 1 to constant-voltage charging at 4.2 V.

5. A lithium-ion secondary battery according to claim 1, wherein the carbon material is natural graphite or synthetic graphite.

6. A lithium-ion secondary battery according to claim 1, wherein the amount of the carbon material supported by the negative electrode active material layer is 3.0 to 4.0 mg/cm².

7. A lithium-ion secondary battery according to claim 1, wherein the amount of the carbon material supported by the negative electrode active material layer is 2.2 to 3.3 mg/cm².

* * * * *